US009977505B2

(12) United States Patent
Balasubramanian et al.

(10) Patent No.: US 9,977,505 B2
(45) Date of Patent: May 22, 2018

(54) CONTROLLING INADVERTENT INPUTS TO A MOBILE DEVICE

(71) Applicant: International Business Machines Corporation, Armonk, NY (US)

(72) Inventors: Swaminathan Balasubramanian, Southfield, MI (US); Andrew R. Jones, Round Rock, TX (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/298,049

(22) Filed: Jun. 6, 2014

(65) Prior Publication Data

US 2015/0355716 A1    Dec. 10, 2015

(51) Int. Cl.
| G06F 3/033 | (2013.01) |
| G06F 3/01 | (2006.01) |
| G06F 9/30 | (2018.01) |
| G06F 3/041 | (2006.01) |
| G06F 3/0488 | (2013.01) |

(52) U.S. Cl.
CPC ............ *G06F 3/017* (2013.01); *G06F 3/0418* (2013.01); *G06F 3/04883* (2013.01); *G06F 9/30* (2013.01)

(58) Field of Classification Search
CPC ........ G06F 3/0488; G06F 3/017; G06F 3/044; G06F 2203/04101; G06F 3/0412; G06F 9/30; G06F 2203/04104; G06F 3/04883; G06F 3/0418
USPC ....................................................... 345/173
See application file for complete search history.

(56) References Cited

U.S. PATENT DOCUMENTS

| 8,136,053 | B1* | 3/2012 | Miller ................. G06F 3/04883 345/156 |
| 8,427,440 | B2 | 4/2013 | Zhang et al. |
| 8,659,570 | B2 | 2/2014 | Townsend et al. |
| 2011/0173574 | A1 | 7/2011 | Clavin et al. |

(Continued)

OTHER PUBLICATIONS

Krishnan et al., "Activity Gesture Spotting Using a Threshold Model Based on Adaptive Boosting", ICME 2010, pp. 155-160.

(Continued)

*Primary Examiner* — Vinh T Lam
(74) *Attorney, Agent, or Firm* — Maeve M. Carpenter; Maxine L. Barasch; Keohane & D'Alessandro, PLLC

(57) ABSTRACT

Embodiments described herein provide approaches for controlling inadvertent inputs to a mobile device. Specifically, at least one approach includes: detecting an operating mode of a mobile device by determining if a user is currently interacting with the mobile device; detecting an operating environment of the mobile device; receiving an input resulting from a physical gesture to an input area of a mobile device; comparing the input to a past history of inputs received by the mobile device; and determining whether the physical gesture is intended by the user based on the operating mode of the mobile device, the operating environment of the mobile device, and the past history of inputs (e.g., per device application). In one approach, an input controller selects logic to be applied in processing gestures based on a combination of user customization, interaction history, and environment characteristics. The selected logic is applied to subsequent gestures.

20 Claims, 4 Drawing Sheets

(56) References Cited

U.S. PATENT DOCUMENTS

| | | | |
|---|---|---|---|
| 2011/0210923 A1* | 9/2011 | Pasquero | G06F 3/04886 345/173 |
| 2012/0023509 A1 | 1/2012 | Blumenberg | |
| 2012/0038555 A1* | 2/2012 | DeLuca | G06F 1/1694 345/168 |
| 2012/0194432 A1* | 8/2012 | DeLuca | G06F 3/011 345/158 |
| 2012/0306768 A1* | 12/2012 | Bailey | G09G 5/00 345/173 |
| 2013/0176264 A1* | 7/2013 | Alameh | G06F 3/038 345/174 |
| 2013/0265261 A1* | 10/2013 | Min | G09G 5/006 345/173 |
| 2013/0265269 A1* | 10/2013 | Sharma | G06F 3/0416 345/173 |
| 2013/0268900 A1* | 10/2013 | Ferren | G06F 3/044 715/863 |
| 2013/0271397 A1 | 10/2013 | Macdougall et al. | |
| 2013/0288647 A1 | 10/2013 | Turgeman | |
| 2014/0002338 A1 | 1/2014 | Raffa et al. | |
| 2014/0306938 A1* | 10/2014 | Block | G06F 3/017 345/178 |
| 2014/0368436 A1* | 12/2014 | Abzarian | G06F 3/0488 345/168 |
| 2015/0177945 A1* | 6/2015 | Sengupta | G06F 3/0488 715/744 |
| 2015/0355716 A1* | 12/2015 | Balasubramanian | G06F 3/017 345/173 |
| 2016/0021238 A1* | 1/2016 | Abramson | H04W 48/04 455/418 |

OTHER PUBLICATIONS

IBM, "Multi-Touch Interactive Floor Recognizes Gestures and Grabs User-Specific and Location Information", IPCOM000160287D, Nov. 9, 2007, 3 pages.

Bernardos et al., "Poster abstract Using a platform for mobile gesture-based interaction to control smart objects", SenSys'13, Nov 11-15, 2013, Roma, Italy, 2 pages.

* cited by examiner

CONTROLLING INADVERTENT INPUTS TO A MOBILE DEVICE

BACKGROUND

1. Field of the Invention

This invention relates generally to mobile device graphical interface technologies and, more specifically, to controlling inadvertent inputs to an input area of a mobile device.

2. Description of the Related Art

A touchscreen interface is an electronic visual display that the user can control through simple or multi-touch gestures by touching the screen with one or more fingers. Some touchscreens can also detect objects such as a stylus or specially coated gloves. The user can use the touchscreen to react to what is displayed and to control how it is displayed. The touchscreen enables the user to interact directly with what is displayed, rather than using a mouse, touchpad, or any other intermediate device. Touchscreens are common in devices such as game consoles, all-in-one computers, tablet computers, and smartphones. They also play a prominent role in the design of digital appliances such as personal digital assistants (PDAs), satellite navigation devices, mobile phones, and video games. The popularity of smart-phones, tablets, and many types of information appliances is driving the demand and acceptance of common touchscreens for portable and functional electronics.

With capacitive touchscreen technology, typically only one side of the insulator is coated with conductive material. A small voltage is applied to this layer, resulting in a uniform electrostatic field. When a conductor, such as a human finger, touches the uncoated surface, a capacitor is dynamically formed. Because of the sheet resistance of the surface, each corner is measured to have a different effective capacitance. The sensor's controller can determine the location of the touch indirectly from the change in the capacitance as measured from the four corners of the panel. Typically, the larger the change in capacitance, the closer the touch is to that corner. With no moving parts, it is moderately durable, but has low resolution, is prone to false signals from parasitic capacitive coupling, and needs calibration during manufacture.

Gesture interfaces based on inertial sensors such as accelerometers and gyroscopes embedded in small form factor electronic devices are becoming increasingly common in user devices such as smart phones, remote controllers and game consoles. In the mobile device space, gesture interaction is an attractive alternative to traditional interfaces because it does not involve the shrinking of the form factor of traditional input devices such as a keyboard, mouse or screen. In addition, gesture interaction is more supportive of mobility, as users can easily perform subtle gestures as they perform other activities.

"Dynamic 3D gestures" are based on atomic movements of a user using inertial sensors such as micro-electromechanical system (MEMS) based accelerometers and gyroscopes. Statistical recognition algorithms, such as Hidden Markov Model algorithms (HMM), are used for gesture and speech recognition and many other machine learning tasks. HMM is effective for recognizing complex gestures and enabling rich gesture input vocabularies. However, due to the nature of statistical algorithms, including the necessary feature extraction and normalization employed to deal with gesture-to-gesture and user-to-user variability, these algorithms often suffer from a high rate of false positives that negatively impact the performance of the system and the user experience.

SUMMARY

In general, embodiments described herein provide approaches for controlling inadvertent inputs to a mobile device. Specifically, at least one approach includes: detecting an operating mode of a mobile device by determining if a user is currently interacting with the mobile device; detecting an operating environment of the mobile device; receiving an input resulting from a physical gesture to an input area of a mobile device; comparing the input to a past history of inputs received by the mobile device; and determining whether the physical gesture is intended by the user based on the operating mode of the mobile device, the operating environment of the mobile device, and the past history of inputs received by the mobile device. In one approach, based on the mode and environment(s), an input controller selects a logic to be applied in processing gestures based on a combination of user customization, interaction history and environment characteristics. The selected logic is then applied on subsequently received gestures.

One aspect of the present invention includes a method for controlling inadvertent inputs to a mobile device, the method comprising the computer-implemented steps of: detecting an operating mode of a mobile device by determining if a user is currently interacting with the mobile device; detecting an operating environment of the mobile device; receiving an input resulting from a physical gesture to an input area of a mobile device; comparing the input to a past history of inputs received by the mobile device; and determining whether the physical gesture is intended by the user based on the operating mode of the mobile device, the operating environment of the mobile device, and the past history of inputs received by the mobile device.

Another aspect of the present invention provides a computer system for controlling inadvertent inputs to a mobile device, the computer system comprising: a memory medium comprising program instructions; a bus coupled to the memory medium; and a processor, for executing the program instructions, coupled to an input controller via the bus that when executing the program instructions causes the system to: detect an operating mode of a mobile device by determining if a user is currently interacting with the mobile device; detect an operating environment of the mobile device; receive an input resulting from a physical gesture to an input area of a mobile device; compare the input to a past history of inputs received by the mobile device; and determine whether the physical gesture is intended by the user based on the operating mode of the mobile device, the operating environment of the mobile device, and the past history of inputs received by the mobile device.

Another aspect of the present invention provides a computer program product for controlling inadvertent inputs to a mobile device, the computer program product comprising a computer readable storage medium, and program instructions stored on the computer readable storage medium, to: detect an operating mode of a mobile device by determining if a user is currently interacting with the mobile device; detect an operating environment of the mobile device; receive an input resulting from a physical gesture to an input area of a mobile device; compare the input to a past history of inputs received by the mobile device; and determine whether the physical gesture is intended by the user based on the operating mode of the mobile device, the operating environment of the mobile device, and the past history of inputs received by the mobile device.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
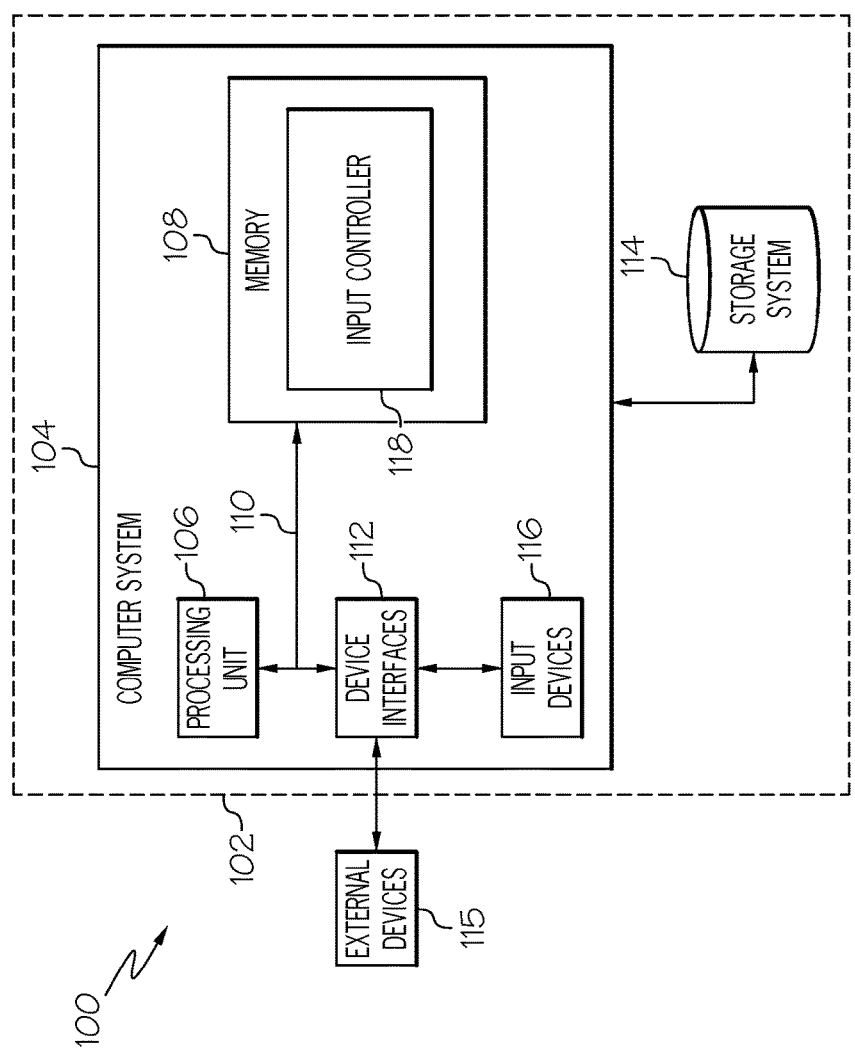
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for controlling inadvertent inputs to a mobile device. Specifically, at least one approach includes: detecting an operating mode of a mobile device by determining if a user is currently interacting with the mobile device; detecting an operating environment of the mobile device; receiving an input resulting from a physical gesture to an input area of a mobile device; comparing the input to a past history of inputs received by the mobile device; and determining whether the physical gesture is intended by the user based on the operating mode of the mobile device, the operating environment of the mobile device, and the past history of inputs received by the mobile device. In one approach, based on the mode and environment(s), an input controller selects logic to be applied in processing gestures based on a combination of user customization, interaction history, and environment characteristics. The selected logic is applied to subsequently received gestures.

It will be appreciated that there are numerous circumstances in which events occur that can potentially result in inadvertent actuations that might produce unintended or undesirable consequences, and in which therefore classification of the actuations as valid or invalid is particularly helpful. For example, there are unintended actions such as the accidental dropping of a mobile device onto a floor or other surface that can inadvertently cause actuation of a button such as a power on/off button of the mobile device or actuation of a touch screen piezoelectric device that, in the absence of consideration of whether the actuation was valid or invalid, could otherwise potentially cause premature termination of a phone call or initiation of an unintended telephone call. Also for example, there are actions to the mobile device that are intended for a particular purpose, yet still can cause unintended and inadvertent mobile device actuator actuations, therefore producing unintended or undesirable consequences.

The approaches described herein contain numerous advantages over present methods, including but not limited to: preventing accidental invocations of mobile device functions, which could lead to loss of data (e.g., placing a call and/or having the unintended caller overhear confidential conversations, forwarding of data, etc.) and/or additional costs for specific services (e.g. network bandwidth, minute charges, text charges). With appropriate consideration by the mobile device as to whether the actuations should be classified as valid or invalid, unintended or undesired mobile device operation and consequences can be avoided.

Referring now to FIG. 1, a computerized implementation 100 of an exemplary embodiment will be shown and described. As depicted, implementation 100 includes computer system 104 deployed within a computer infrastructure, such as a mobile device 102. This is intended to demonstrate, among other things, that the present invention could be implemented within a network environment (e.g., the Internet, a wide area network (WAN), a local area network (LAN), a virtual private network (VPN), etc.), a cloud-computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, mobile device 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for controlling inadvertent inputs to mobile device 102. It should be understood that any other computers implemented under the present invention may have different components/software, but will perform similar functions. As shown, computer system 104 includes a processing unit 106 capable of communicating with an input controller 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115, input devices 116, and input controller 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating input controller 118, which is stored in memory 108 and/or storage system 114. While executing computer program code, processing unit 106 can read and/or write data to/from memory 108, storage system 114, and input controller 118. Storage system 114 can include VCRs, DVRs, RAID arrays, USB hard drives, optical disk recorders, flash storage devices, and/or any other data processing and storage elements for storing and/or processing data.

Figure 2:
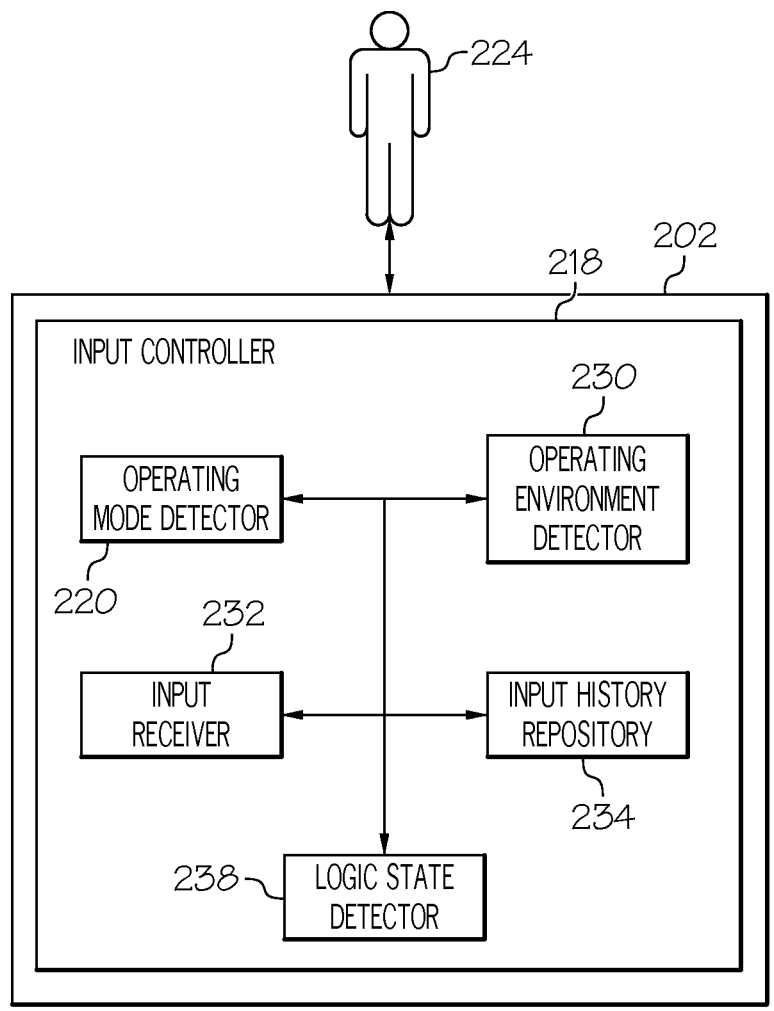
FIG. 2 shows a more detailed view of an input controller for controlling inadvertent inputs to a mobile device according to illustrative embodiments.

Referring now to FIG. 2, the structure and operation of mobile device 202 and input controller 218, which together are capable of detecting and controlling inadvertent inputs, will be described in greater detail. In various embodiments, mobile device 202 may include, without limitation, a mobile computing device, a smart phone, a telephone, a digital telephone, a cellular telephone, eBook readers, a personal digital assistant (PDA), a handset, an ultra-mobile device, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

As shown, input controller 218 includes an operating mode detector 220 configured to detect an operating mode of mobile device 202 by determining if a user 224 is currently interacting with mobile device 202. The operating mode may be determined, e.g., using a mobile device accelerometer and/or gyroscope, using camera phone face detection, or using a combination of the accelerometer and face detection. In one embodiment, mobile device 202 may be operating in one of the following modes. "Active but not in use," which occurs when a touchscreen of mobile device 202 is turned on but mobile device 202 is not in active use, e.g., when it is placed in the user's pocket, bag, car, or the like. The specific movement/bounce characteristics, as measured by the accelerometer, may be used to determine this mode. In some embodiments, the accelerometer and/or gyroscope may comprise or be implemented using micro-electromechanical systems (MEMS) technology. Another mode includes "in active use," which occurs when user 224 is actively interacting with device 202. In one embodiment, known methods of using a front facing camera may be used to determine this mode as well.

Input controller 218 further comprises an operating environment detector 230 configured to detect an operating environment of mobile device 202. That is, based on the location, movement, acceleration, time of day, interaction activities performed by user 224, etc., an operating environment is determined and assigned. The following environments are contemplated and described herein for the sake of explanation. However, this list is meant as non-limiting, as numerous other operating environments are possible. 1) Jerky/shaky motion by mobile device 202, which is detected using a combination of the device accelerometer and front facing camera. 2) Location of mobile device 202, which is determined, e.g., by a device compass and/or a mapping program. 3) Activity of mobile device 202 (e.g., single or multitasking), which is determined based on the user interactions with mobile 202, wherein operating device detector 230 determines if user 224 is working on a single application or is multitasking. 4) Time of day, which is determined using the mobile device clock. 5) Movement of mobile device 202, which is determined, e.g., using a GPS application to determine this operating environment. It will be appreciated that mobile device 202 may be in multiple environments at the same time.

As user 224 interacts with applications on mobile device 202, an input receiver 232 of input controller 218 monitors and stores characteristics of a user gesture, e.g., the duration of touch and pressure applied to an input area of mobile device 202, which is then stored within an input history repository 234. In an exemplary embodiment, input receiver 232 uses input history repository 234 to determine how to processes gestures of user 224. As part of this determination, input receiver 232 detects an average/expected duration of touch and an average pressure amount applied to a input area of mobile device 202. This average/expected touch and pressure data may be determined per device application (e.g., text messaging, e-mail, social media, etc.), or broadly across mobile device 202. By normalizing this input, a baseline is set that shows the typical values for these user input parameters. Any number of algorithms could be used to define this number (e.g., simple averaging over a period of time, or during a calibration step for pressure values, gesture speed, tap speed, etc.).

In one embodiment, input history repository 234 may include trained gestures or gesture models to analyze any number of gestures. For example, the gesture models may be developed based on inertial sensor training data and/or offline training where gesture motions are performed (possibly repeatedly) using mobile device 202, and the inputs are tracked and recorded. In some embodiments, this may occur during a training phase where a user can select or is prompted to perform one or more gesture motions and the gesture motions are associated with one or more activities or tasks. In other embodiments, the gesture models may be pre-defined and/or pre-loaded onto mobile device 202.

In addition to storing gesture models, start and end poses may also be stored in input history repository 234. For example, as part of offline training, start poses and end poses associated with gestures may be identified based on accelerometer readings that are stationary before and after a pose. Operating mode detector 220 may be operative to establish the start/end poses using, for example, three accelerometer axes Ax, Ay, Az measurements using bounding boxes or a Gaussian model using average Ax, Ay, Az values (+/−3 standard deviation) to identify the start and end pose for each gesture. The start and end poses may be used for pose filtering in some embodiments.

In an exemplary embodiment, an input logic state is assigned to mobile device 202 based on the current operating mode and the operating environment. That is, a logic state detector 238 of input controller 218 performs gesture preprocessing within mobile device 202. In cases where multiple environments apply, it'll be appreciated that the preprocessing may apply an intersection of the logic associated with each mode/environment combination. The preprocessing may allow the following non-limiting logic states to be applied to mobile device 202.

| Mode/Operating Environment | Gesture Preprocessing Logic |
| --- | --- |
| Active but not in use | Disable all touchscreen gesture processing; Disable any gesture associated with jerky motion such as shaking the device |
| Active use, Jerky Motion | Lower sensitivity of the touchscreen; Increase threshold of acceptance of any gesture associated with jerky motion; Enable navigation using device tilt left/right/up/down |
| Active use, Location | Use interaction history to determine if a gesture associated with an application or application category has been performed previously at this location. If not, ignore the gesture or lower sensitivity or raise the gesture acceptance threshold |
| Active use, Activity (single application) | Use interaction history to determine if the gesture associated with the application has been previously performed and is within normal threshold. If not, ignore the gesture, lower contact sensitivity, or raise the gesture acceptance threshold |
| Active use, Activity (multitasking) | Use interaction history or application category to determine the related applications, and increase sensitivity around those applications; For unrelated applications, ignore the gesture, lower the sensitivity, or raise the gesture acceptance threshold |
| Active use, Time of day | Use interaction history to determine if the gesture associated with the application has been previously performed at that time of the day. If not, ignore the gesture or lower sensitivity or raise the gesture acceptance threshold |
| Active use, Moving | Lower contact sensitivity of the touchscreen; Increase threshold of acceptance of any gesture unless the gesture is associated with an application in the travel category |
| Active use, Default | Use user customization or interaction history to ignore any gesture that is outside the observed normal |

Once the preprocessing step is completed, the defined logic is applied to subsequent gestures to the mobile device.

Figure 3:
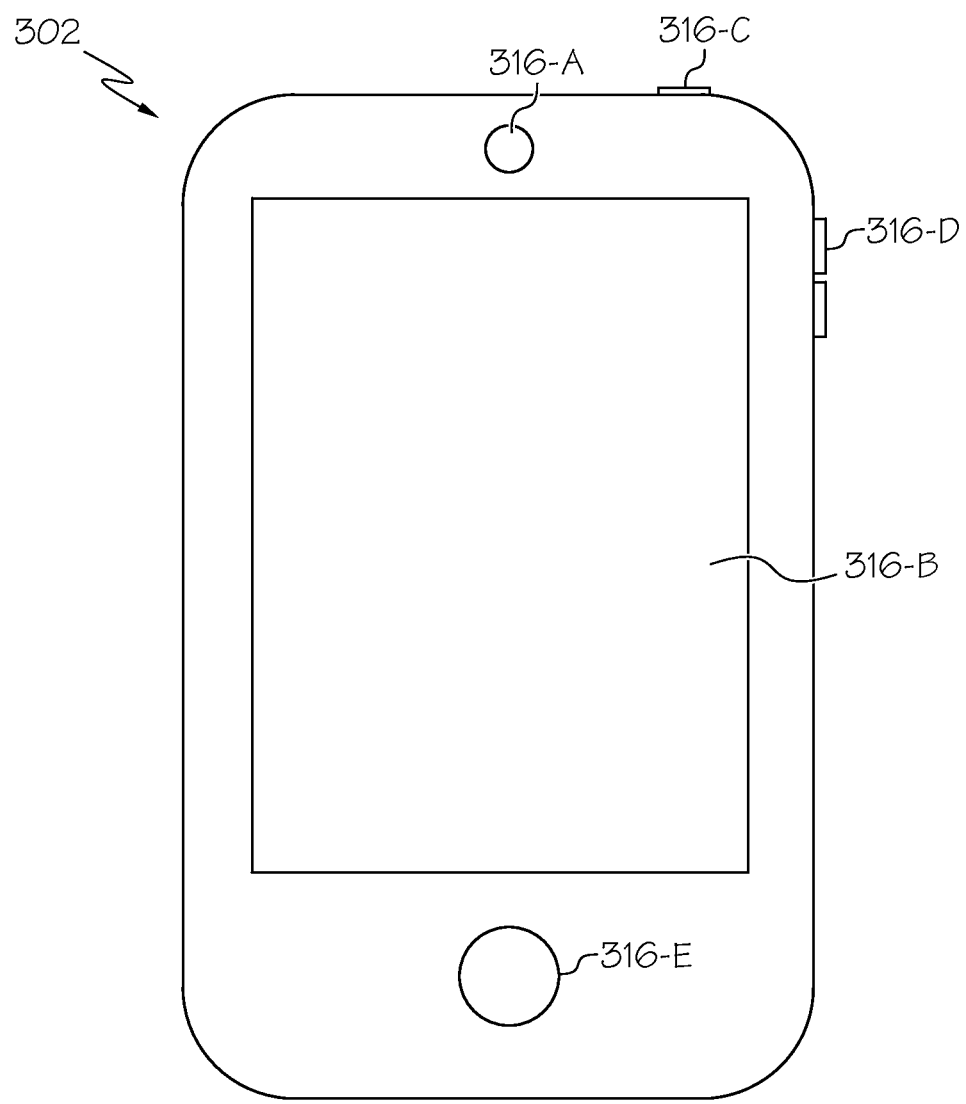
FIG. 3 shows an exemplary mobile device according to illustrative embodiments.

Turning now to FIG. 3, an exemplary mobile device 302 will be described in greater detail. Although not shown, mobile device 302 may further comprise one or more device resources commonly implemented for electronic devices, such as various computing and communications platform hardware and software components typically implemented by a personal electronic device. Some examples of device resources may include, without limitation, a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. The embodiments, however, are not limited to these examples.

During use, mobile device 302 receives an input resulting from a physical gesture (e.g., a touch, movement of the user's hand, movement of the mobile device, etc.) to an input area of mobile device 302. In various embodiments, the input area may comprise one or more input/output components 316A-E, which provide functionality to mobile device 302 including, but not limited to, exchanging information, capturing or reproducing multimedia information/data, capturing images, determining a location of mobile device 302, or any other suitable functionality. Non-limiting examples of input/output devices include a camera 316-A (e.g., front facing), QR reader/writer, bar code reader, a global positioning system (GPS) module, a display 316-B, a power button 316-C, volume/toggle buttons 316-D, and a home button 316-E. However, it'll be appreciated that other input/output components may be present on mobile device 302 depending on the specific model and mobile device type.

Display(s) 316-B may comprise any digital display device suitable for mobile device 302. For instance, display 316-B may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of mobile device 302. Display 316-B may further include some form of a backlight or brightness emitter as desired for a given implementation.

In various embodiments, display 316-B may comprise a touch-sensitive or touchscreen display. A touchscreen may comprise an electronic visual display that is operative to detect the presence and location of a touch within the display area or touch interface. In some embodiments, the display may be sensitive or responsive to touching of the display of the device with a finger or hand. In other embodiments, the display may be operative to sense other passive objects, such as a stylus or electronic pen. In exemplary embodiments, display 316-B enables a user to interact directly with what is displayed, rather than indirectly with a pointer controlled by a mouse or touchpad.

In a typical scenario, contact with a floating top lens of the touch screen of display 316-B causes an electric signal to be output by a piezo frame for receipt by another component of the device (e.g., a processor). Such an actuation can potentially be a valid actuation that is the result of an intended input, e.g., a person intentionally touching display 316-B, or alternatively can potentially be an invalid actuation, e.g., an actuation that is the result of a movement or application of force other than an intended touch to the touch screen, such as when mobile device 302 is dropped onto the floor or bounces around within a bag, purse, briefcase, etc.

Following receipt of a physical gesture from a user, the input is compared to a past history of inputs (e.g., within input history repository 234) received by mobile device 302 to determine whether the physical gesture is intended by the user. That is, using the previously determined average/expected duration of touch and an average pressure amount applied to one or more of input areas 316A-E of mobile device 302, it is determined whether the present input is accidental or intended based on the relative similarities and/or differences between the input and the past history of inputs for a given operating mode and operating environment, as well as for a specific device application. The input is ignored in the case that the physical gesture is deemed inadvertent and unintended by the user, or the input is accepted in the case that the physical gesture is intended, thus invoking one or more functions on mobile device 302 linked to input areas 316A-E. In the case that no sufficient input match is obtained, the gesture may be ignored, the sensitivity of input/output components 316A-E lowered, or the gesture acceptance threshold raised.

In exemplary embodiments, the input history is associated with a specific application or group of applications operating on mobile device 302. As such, an input associated with one application may be ignored, while a similar input may be accepted and processed with a second application. In another embodiment, the input history is generic across applications. In both cases, based upon this historical information, system thresholds are set that can be used to determine the state of the device. These thresholds could also be user adjustable and/or continually adjusted over time and use.

Referring again to FIGS. 2-3, embodiments herein are demonstrated through the following non-limiting examples.

Accelerometer Based Detection

The input controller 218 (FIG. 2) detects that mobile device 302 is in a pocket/briefcase based on data received from an accelerometer. A difference is detected because the motion of mobile device 302 is different in a moving hand (even if the person is moving) than the movement and/or bouncing around a pocket. Input controller 218 then detects an inadvertent function invocation based on the duration of presses or touches falling outside the normal range for the user and the application currently in focus. Detection might be based on, e.g., a large number of light taps all over the screen (eventually hitting a function), or a single input (e.g., an area of display 316-B) contacted or depressed for a long period of time.

Location Based Detection

In this example, mobile device 302 uses a compass or mapping program to determine the location of user 224. If user 224 is in a geographic area in which he/she doesn't commonly use a category of application, input controller 218 ignores the request. Alternately, input controller 218 may lower the touchscreen sensitivity of display 316-B in an area around the application icon for that category.

Activity Based Detection

In this example, user 224 is talking on mobile device 302 and getting ready to multitask. Based on historic activity data, input controller 218 determines if user 224 has selected a relevant application. This could include applications in the same category such as productivity or browsing, etc. In another embodiment, input controller 218 increases sensitivity around related apps. In yet another embodiment, if a telephone number being dialed fits a known dialing pattern, or is a number that is regularly dialed, it is likely to be intended and, therefore, accepted by input controller 218.

GPS Based Detection

In this example input controller 218 adjusts sensitivity based on whether the GPS is reporting the mobile device as moving or travelling. Based on this operating environment, input controller 218 can increase the time required to invoke a function, or may ignore inputs to applications unrelated to travel by disabling one or more physical gesture processing operations on mobile device 302.

It can be appreciated that the approaches disclosed herein can be used within a computer system to control inadvertent inputs to a mobile device. In this case, as shown in FIGS. 1-2, the input controller can be provided, and one or more systems for performing the processes described in the invention can be obtained and deployed to mobile device 102 (FIG. 1). To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 4:
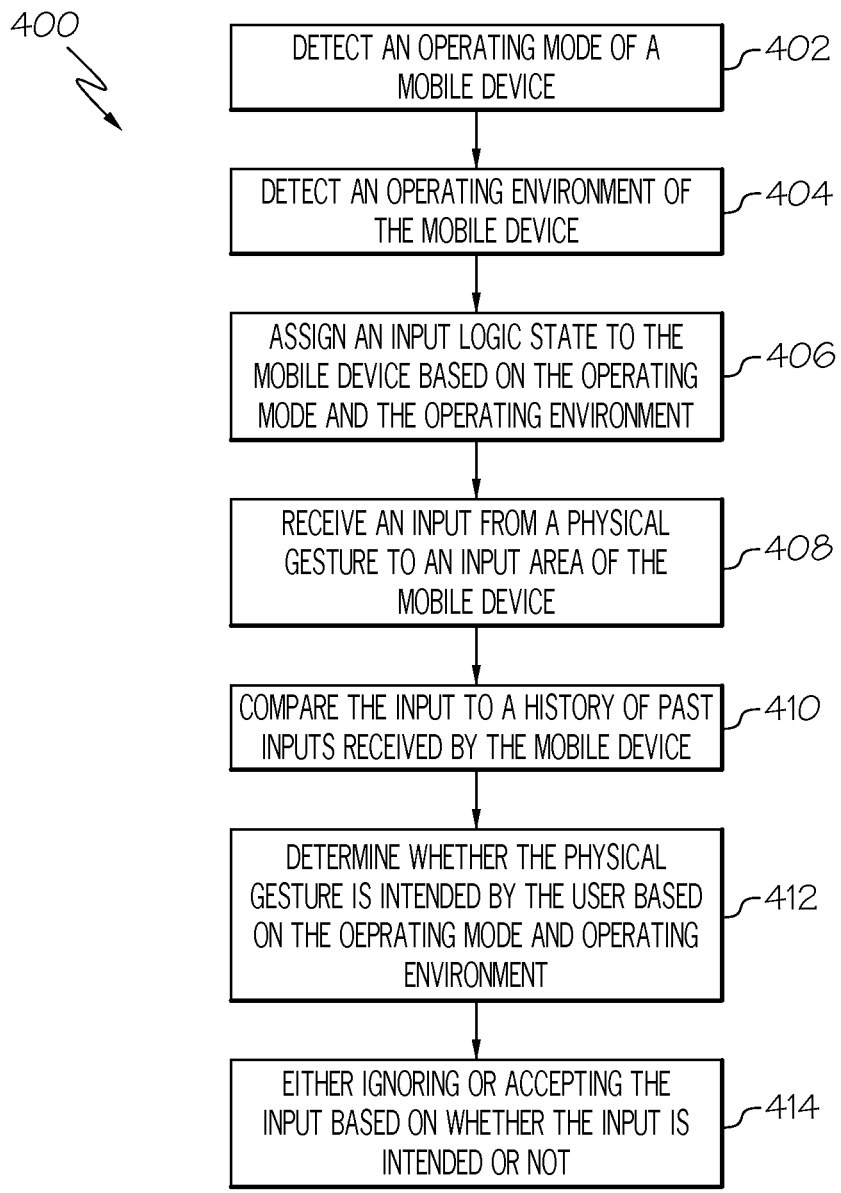
FIG. 4 shows a process flow for controlling inadvertent inputs to a mobile device according to illustrative embodiments.

As depicted in FIG. 4, a system (e.g., computer system 104) carries out the methodologies disclosed herein. Shown is a process flow 400 for controlling inadvertent inputs to a mobile device. At 402, an operating mode of a mobile device is detected to determine if a user is currently interacting with the mobile device. At 404, an operating environment of the mobile device is detected. At 406, an input logic state is assigned to the mobile device, the input logic state based on the operating mode and the operating environment of the mobile device. At 408, an input resulting from a physical gesture to an input area of the mobile device is received. At 410, the input is compared to a past history of inputs received by the mobile device. At 412, it is determined whether the physical gesture is intended by the user based on the operating mode of the mobile device, the operating environment of the mobile device, and the past history of inputs received by the mobile device. At 414, the input is ignored in the case that the physical gesture is not intended by the user, or a function is initiated on mobile device resulting from the input in the case that the physical gesture is intended by the user.

Process flow 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, input controller 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for controlling inadvertent inputs to a mobile device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for controlling inadvertent inputs to a mobile device, the method comprising plurality of computer-implemented steps of:
   detecting an operating mode of the mobile device by determining if a user is currently interacting with the mobile device;
   detecting an operating environment of the mobile device, wherein the detecting comprises:
      analyzing data received from an accelerometer,
      determining that the mobile device is in a pocket or a briefcase of the user based on the data received from the accelerometer,
      analyzing global positioning system information, and
      determining that the user is traveling based on the global positioning system information;
   increasing an amount of time required to invoke a function based on the determination that the user is traveling;
   receiving an input resulting from a physical gesture to an input area of the mobile device;
   comparing the input to a past history of inputs, received by the mobile device, for an application of a set of applications on the mobile device;
   evaluating, based on the comparing, whether the input is within a normal range for the application;
   determining whether the physical gesture is intended by the user based on the operating mode of the mobile device, the evaluation, an amount of time passing in entry of the input; and the determination that the user is traveling; and
   disabling one or more physical gesture processing operations on the mobile device to ignore inputs to applications unrelated to the travelling of the user.

2. The method of claim 1, further comprising ignoring the input in the case that the physical gesture is not intended by the user, and invoking one or more functions on the mobile device associated with the input in the case that the physical gesture is intended by the user.

3. The method of claim 1, further comprising assigning, prior to receipt of the input, an input logic state to the mobile device based on the operating mode and the operating environment.

4. The method according to claim 3, further comprising adjusting a contact sensitivity of the input area of the mobile device based on the input logic state of the mobile device.

5. The method according to claim 3, further comprising disabling one or more physical gesture processing operations on the mobile device.

6. The method according to claim 1, the operating environment based on at least one of: a location of the mobile device, a set of activities being performed by the user on the mobile device, time of day, date, and motion of the mobile device.

7. The method according to claim 1, further comprising determining, based on the past history of inputs for each of a set of applications operating on the mobile device, an average duration of touch and an average pressure amount applied by the user to the input area of the mobile device.

8. A computer system for controlling inadvertent inputs to a mobile device, the computer system comprising:
   a memory medium comprising program instructions;
   a bus coupled to the memory medium; and
   a processor, for executing the program instructions, coupled to an input controller via the bus that when executing the program instructions causes the computer system to:
      detect an operating mode of the mobile device by determining if a user is currently interacting with the mobile device;
      detect an operating environment of the mobile device, wherein the detecting comprises:
         analyzing data received from an accelerometer,
         determining that the mobile device is in a pocket or a briefcase of the user based on the data received from the accelerometer,
         analyzing global positioning system information, and
         determining that the user is traveling based on the global system information;

increase an amount of time required to invoke a function based on the determination that the user is traveling;

receive an input resulting from a physical gesture to an input area of the mobile device;

compare the input to a past history of inputs, received by the mobile device, for an application of a set of applications on the mobile device;

evaluate, based on the comparing, whether the input is within a normal range for the application;

determine whether the physical gesture is intended by the user based on the operating mode of the mobile device, the evaluation, an amount of time passing in entry of the input; and the determination that the user is traveling; and disable one or more physical gesture processing operations on the mobile device to ignore inputs to applications unrelated to the travelling of the user.

9. The computer system of claim 8, the program instructions further causing the computer system to ignore the input in the case that the physical gesture is not intended by the user, and invoking one or more functions on the mobile device associated with the input in the case that the physical gesture is intended by the user.

10. The computer system of claim 8, the program instructions further causing the computer system to assign, prior to receipt of the input, an input logic state to the mobile device based on the operating mode and the operating environment.

11. The computer system of claim 10, the program instructions further causing the computer system to adjust a contact sensitivity of the input area of the mobile device based on the input logic state of the mobile device.

12. The computer system of claim 10, the program instructions further causing the computer system to disable one or more physical gesture processing operations on the mobile device.

13. The computer system of claim 8, the operating environment based on at least one of: a location of the mobile device, a set of activities being performed by the user on the mobile device, time of day, date, and motion of the mobile device.

14. The computer system of claim 8, the program instructions further causing the computer system to determine, based on the past history of inputs for each of a set of applications operating on the mobile device, an average duration of touch and an average pressure amount applied by the user to the input area of the mobile device.

15. A computer program product for controlling inadvertent inputs to a mobile device, the computer program product comprising a computer readable storage medium, and program instructions stored on the computer readable storage medium, to:

detect an operating mode of the mobile device by determining if a user is currently interacting with the mobile device;

detect an operating environment of the mobile device, wherein the detecting comprises:

analyzing data received from an accelerometer, determining that the mobile device is in a pocket or a briefcase of the user based on the data received from the accelerometer, analyzing global positioning system information, and determining that the user is traveling based on the global positioning system information;

increase an amount of time required to invoke a function based on the determination that the user is traveling;

receive an input resulting from a physical gesture to an input area of the mobile device;

compare the input to a past history of inputs, received by the mobile device, for an application of a set of applications on the mobile device;

evaluate, based on the comparing, whether the input is within a normal range for the application;

determine whether the physical gesture is intended by the user based on the operating mode of the mobile device, the evaluation, an amount of time passing in entry of the input, and the determination that the user is traveling; and disable one or more physical gesture processing operations on the mobile device to ignore inputs to applications unrelated to the travelling of the user.

16. The computer program product of claim 15, the computer readable storage medium further comprising program instructions to ignore the input in the case that the physical gesture is not intended by the user, and invoking one or more functions on the mobile device associated with the input in the case that the physical gesture is intended by the user.

17. The computer program product of claim 15, the computer readable storage medium further comprising program instructions to assign, prior to receipt of the input, an input logic state to the mobile device based on the operating mode and the operating environment.

18. The computer program product of claim 17, the computer readable storage medium further comprising program instructions to adjust a contact sensitivity of the input area of the mobile device based on the input logic state of the mobile device.

19. The computer program product of claim 17, the operating environment based on at least one of: a location of the mobile device, a set of activities being performed by the user on the mobile device, time of day, date, and motion of the mobile device.

20. The computer program product of claim 15, the computer readable storage medium further comprising program instructions to determine, based on the past history of inputs for each of a set of applications operating on the mobile device, an average duration of touch and an average pressure amount applied by the user to the input area of the mobile device.

* * * * *